United States Patent

[11] 3,561,615

| [72] | Inventors | Terry A. Forsberg<br>1216 W. Jolly Road, Okemos, Mich. 48864;<br>Robert Eugene Smith, 3598 Stagecoach Drive, Okemos, Mich. 48864 |
|---|---|---|
| [21] | Appl. No. | 842,173 |
| [22] | Filed | July 16, 1969 |
| [45] | Patented | Feb. 9, 1971 |

[54] PIPE POSITIONING AND HANDLING DEVICE
5 Claims, 8 Drawing Figs.

[52] U.S. Cl. .................................................. 214/1, 29/237
[51] Int. Cl. ............................................... B23p 19/04
[50] Field of Search ..................................... 214/1P, 1 (P.L.); 29/237; 254/29

[56] References Cited
UNITED STATES PATENTS

| 3,036,372 | 5/1962 | Vigneron | 214/1(P.L.)X |
| 3,207,326 | 9/1965 | Enix | 214/1(P.L.) |

*Primary Examiner*—Gerald M. Forlenza
*Assistant Examiner*—Frank E. Werner
*Attorney*—Miller, Morriss, Pappas and McLeod and William J. Morriss

ABSTRACT: An hydraulically actuated pipe manipulating structure wherein a single hydraulic element imparts axial movement and cooperating selected gripping and relaxation of grip in accord with desired location of piping.

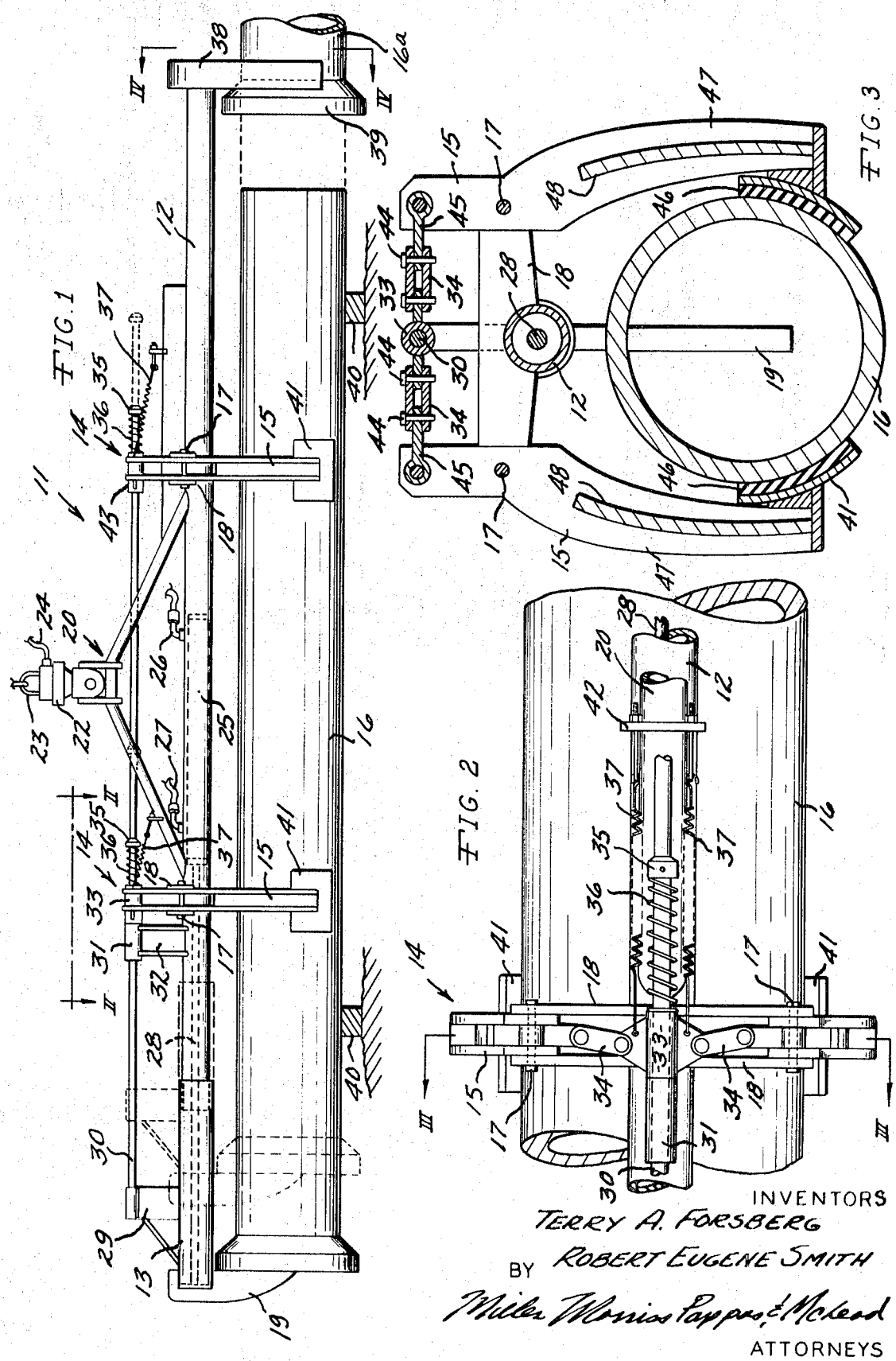

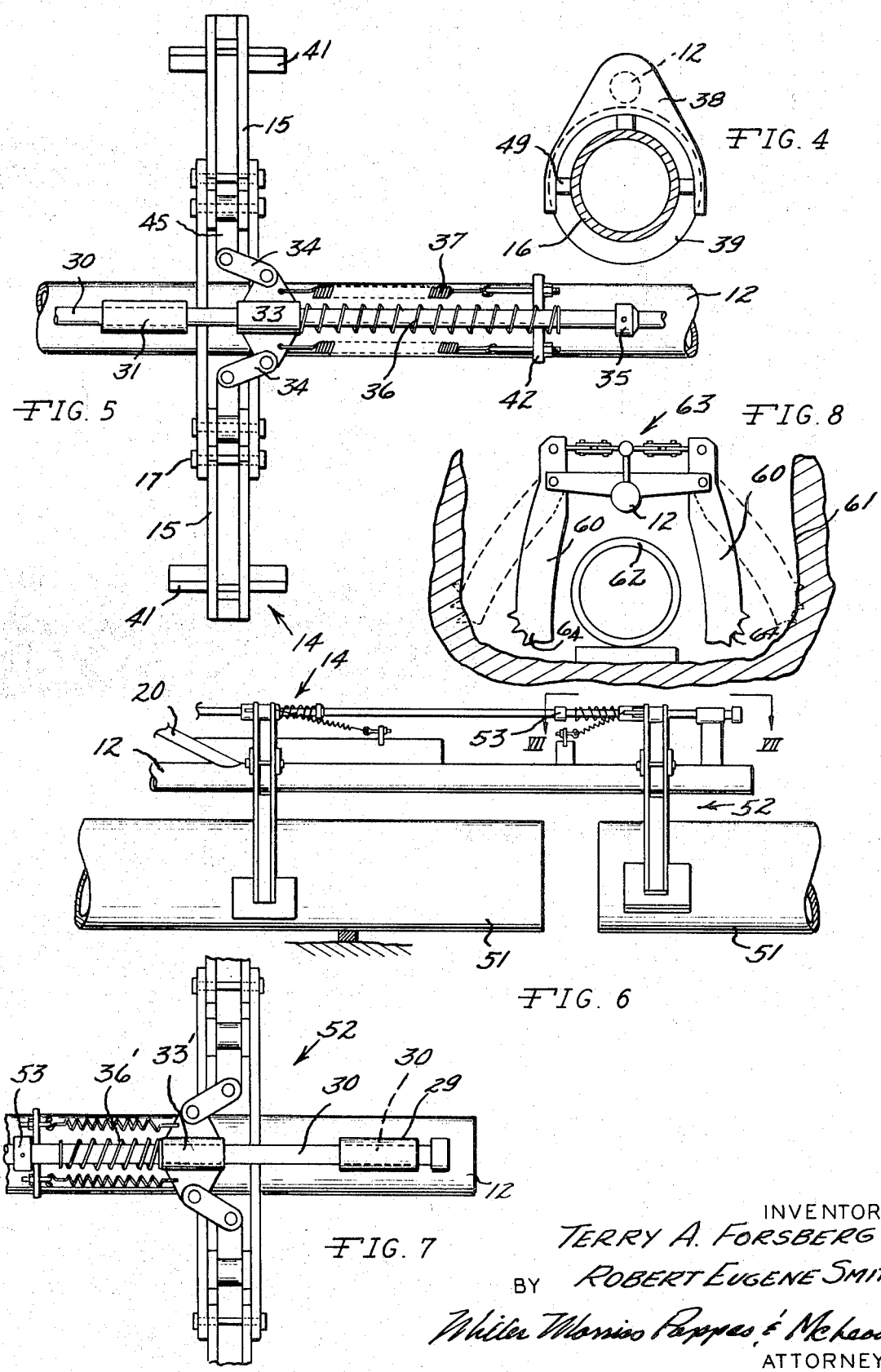

//
3,561,615

PIPE POSITIONING AND HANDLING DEVICE

The present invention is a pipe positioning and handling device useful in laying pipe in pipelines, and including water and sewage mains and stubs and particularly where the pipe is located in an earth opening or ditch where successive lengths of pipe must be connected in end to end relation over some substantial distance requiring precision location of the pipe, orientation of the pipe axis, and longitudinal movement of the pipe to seat it as in bell and spigot connections, butt joining, or in collared connection. The present invention coordinates longitudinal movement during support with selected grip and relaxation of grip during selected movement of the pipe. In addition the handling device as described assures a grip upon the pipe which allows longitudinal pipe movement during support of the pipe and releases the pipe at the appropriate time in the sequence of laying.

The prior art as known to the inventors is best represented in the disclosures of Vigneron, U.S. Pat. No. 3,036,372; Mitchell, U.S. Pat. No. 2,378,570 for grapple; Dieters, U.S. Pat. No. 2,403,346 for grapple for handling crossties and the like; Dark, U.S. Pat. No. 2,880,031, for tile laying device; and Helms, U.S. Pat. No. 3,237,980 for a device for clamping cylindrical objects. The concept of gripping and releasing elongate objects is well developed and in the Vigneron work a structure is shown for imparting an axial thrust to pipe. None of the work seen shows a concept of simultaneous longitudinal movement of piping and accompanying selected gripping and release and the latter coordinated with movement of a single linear actuator.

Accordingly, the present invention has as its principle object the provision of a device which lifts, locates, longitudinally moves tubing or piping and grips or relaxes its grip in accord with desired or selected cycling.

Another object is to provide a buffered gripping mechanism to provide a synthetic "feel" of the tubing or piping to avoid inadvertent damage or collapse of tubing or pipe.

Still another object is to provide a very simple pipe handling device which is field adaptable to a variety of pipe line tasks and in which the frame structure is telescopically extendable and collapsible using available sources of hydraulic power for pivoting as well as coordinated locking and unlocking.

Other objects including ruggedness of construction, ease of service and overall simplicity will be appreciated by those skilled in the art as the description proceeds.

GENERAL DESCRIPTION

An elongate tubular base frame is provided. A tubular frame extension provides a coaxial extension of the base frame and is telescopically slidable over the base frame. An hydraulic cylinder of the double acting type is provided in the base frame and its piston extends coaxially inside the base frame to connection within the frame extension. Selected energization of the hydraulic motor thereby moves the frame extension toward and away from the main or base frame on the axis thereof and in journaled sliding support relationship on the base frame. The outboard terminal end of the base extension includes a depending push plate which moves in accord with the movement of the frame extension and provides the means for applying longitudinal thrust to the pipe or tubing being manipulated.

A stanchion extending radially from the upper side of the frame extension fixedly supports an actuator rod which extends in parallel relation above the main or base frame and the actuator rod moves or reciprocates in accord with the movement of the frame extension. The actuator rod is journaled by one or more rod brackets which form lineal bearings radially supported by the base frame. The actuator rod passes through a plurality of center link elements in toggle systems secured to grapples which open and close in accord with the positioning of the toggle elements. In centered relation the grapples are closed. In off center relation the grapples are open. A support channel is welded or otherwise secured in transverse relation to the frame and provides a pivotal support for the grapple jaw elements comprising the grapple system.

Hence the actuator rod provides a positioning vehicle exactly timed with axial movement of the pipe pusher on the frame extension. By using a toggle arrangement for opening and closing the jaws of the grapples which is on the rod, a position sensing toggle arrangement results.

Tension springs act on the center link tending to apply a normal opening bias to the grapples. Compression springs intermediate the center link and fixed end stops located on the actuator rod provide a buffer limiting the closing pressure of the grapple elements. Hence, the stops in accord with selected movement of the actuator rod apply a resilient bias to the compression springs and hence to the center link urging to a slightly over center resiliently locked position against the journal brackets. An opposite movement of the rod accomplishes relaxation of the compression spring and consequent opening of the grapples urged by the tension springs. This is accomplished simultaneously in plural grapples as will be seen and since the movement of the actuator rod is coordinated with axial movement of the frame extension the selected gripping and relaxing of grip on tubing or pipe can be coordinated with the axial movement of the pipe as imparted by the push plate acting on the outboard end of tubing. Where bell and spigot piping is being installed a yoke on the outboard end of the base frame provides a thrust yoke for the device allowing a strong axial thrust to be imparted to the pipe by the cylinder which pulls on the extension of the frame. A bail or hanger is rigidly secured to the main or base frame to allow simple manipulation as by a crane, back hoe or hoist attachment well known in the art. However, at the point of connection a rotary vane type hydraulic motor is provided at the pivot support link and permitting 180 pivotal control over the pipe in the plane established by the pipe axis. As will be seen the structure of the present invention is adaptable to simple variations to accommodate pipe which does not include collars or bells. Then selected extension of the jaws wedges the entire handling device in the trench or excavation so that the thrust of the pusher plate on the pipe is possible. Since the stops are adjustable in relation to the toggles working the opening and closing of jaws, selected grapples may be opened and others closed simultaneously as may be required where tubing or casing without collars or bells is to be joined.

The structure of the present invention is best revealed by reference to the drawings.

In the Drawings

FIG. 1 is a front elevation view of a structure in accord with the present invention gripping a section of bell and spigot pipe and in phantom line indicating the axial movement of said pipe section to connection in the bell of a previously positioned section of pipe.

FIG. 2 is a partial top plan view of a grapple and indicating the toggle lock mechanism at each grapple.

FIG. 3 is a full section view taken on the line 3-3 of FIG. 2 and indicating the grapple support carriage and details of the pipe support pads.

FIG. 4 is a cross section elevation view of the yoke element gripping the bell end or previously positioned pipe.

FIG. 5 is a top plan view of one of the grapple elements and indicating the toggle clamp in full open position.

FIG. 6 is a partial front elevation view of a device in accord with the present invention but modified to allow opening of one grapple and closing of another.

FIG. 7 is a partial top plan view of the structure shown in FIG. 6 and indicating how the toggle opens using the adjustable stop.

FIG. 8 is a side elevation section through a trench and indicating modified grapple jaws expanding to wedge in the trench to provide a thrust buttress against which axial thrust can be accomplished on the tubing or pipe.

SPECIFIC DESCRIPTION

Referring to the drawings and particularly to FIG. 1 thereof a pipe handling device 11 in accord with the invention is best shown. This comprises a tubular main or base frame 12. A tubular frame extension element 13 in the form of a sleeve slidable on the main or base frame 12 is secured to one end thereof. Grapples 14 which are secured to the base frame 12 are spacedly positioned intermediate the ends of the base frame 12. The grapples 14 are provided with jaws 15 which open and close on the pipe 16. The pins 17 providing pivot points secure the jaws 15 to the carriers 18. A push plate 19 is secured to and depends from the end of the frame extension 13 in thrust relation against the pipe 16. Hence movement of the frame extension 13 also moves pipe 16 axially. A bail element 20 is secured to the base frame 12 and at the apex thereof is swivel connection or universal pivot 21. The horizontal axes of the universal pivot 21 are movable through at least 180° of traverse by a rotary vane type hydraulic motor 22. The motor 22 is provided with a hook eye 23 or lifting ring allowing a lift of the entire device 11 as by a crane, back hoe, derrick or the like well-known in the art. Hydraulic connections 24 provide operator swivel control and the circuits therefor are not a part of the present invention. The hydraulic line 24 is suitably connected to a source of hydraulic power as for example from hydraulic takeoffs on a crane or lift mechanism, not shown.

Inside the tubular base frame 12 is positioned a double acting hydraulic motor 25 which is also connected to a source of hydraulic energy not shown but the hydraulic lines 26 and 27 are indicated. The piston 28 of the motor 25 is secured to the frame extension 13 and on full extension the push plate 19 is shown as indicated in full lines. When the piston 28 is retracted the frame extension 13 and push plate 19 are positioned as indicated in phantom line. A stanchion 29 extends radially upward from the frame extension 13 and being secured thereto moves with the tubular frame extension 13. The stanchion 29 supports an actuator rod 30 which extends parallel to the main frame 12 and in spaced relation above the frame 12. Hence, upon movement of the frame extension 13 under influence of the piston 28 an axial movement is also imparted to the actuator rod 30. The axial movement is suitably journaled by the bearings 31 in bearing brackets 32. In some instances more than one such bracket 32 is employed. The actuator rod 30 also passes through center links 33 connected, as will be seen to toggle elements 34, which, depending upon their relative position, close or open the grapples 14. Stops 35 are positioned selectively on the rod 30 and influence through compression springs buffers 36, the closing grip of the jaws 15 of the grapples 14. Tension springs 37 secured to the center link elements 33 provide a return bias toward full open when the stops 35 selectively fixed on rod 30 retreat from the closing position. On the stationary end of the main frame 12 is a yoke 38, which as will be seen provides a thrust support on the preceding piece of pipe 16a by straddling the pipe and bearing against the enlarged bell portion 39. Such firm support allows the pipe 16 to be axially thrust into the bell end 39 of the pipe 16a by action of the motor 25, and during this motion the grip on the pipe 16 is relaxed to full open after entry into the bell 39 of pipe 16a and the pipe 16 is thereupon supported by the blocks 40 which have been positioned beneath the pipe 16 when alignment has been established.

Grips 41 are secured to the terminal ends of the jaws 15 and these are contoured on their faces to conform to the surface configuration of the pipe 16. As will be seen the grips 41 may include a rubber facing to avoid marring of pipe and to assume a satisfactory grip.

By reference to FIG. 2 the grapples 14 comprising opening and closing jaws 15 pivotal on the pins 17 securing the jaws to the carrier plates 18 are best shown in jaw closed position. This condition occurs when the actuator rod 30, urged by the piston 28 and outboard movement of the extension frame 13 and thrust plate 19 is shifted to the lift as reference to FIG. 2. The stop 35 travelling with the rod 30 engages the compression spring 36 forcing the center link 33 toward the overcenter position as shown. The advantage of the compression spring is to avoid damaging pressure on the pipe 16 and to provide a cushion or "feel" in the jaws 15. As the push rod 30 is moved to the right in the FIG. 2 the pipe 16 is engaged by the thrust plate 19 for axial shifting and the grip on the pipe 16 is gradually relaxed as the compression spring 36 relaxes and the tension springs 37 pull the center link 33 and toggle elements 34 in the direction of the movement of rod 30 and away from the over center closed position seen. The tension springs 37 are secured at one end to the center links 33 and at the other end to a bracket 42 extending upwardly from the main frame 12. The bracket 32 and bearing 31 provide a stop limiting travel of the center link 33 in one direction. Journals 31 may be similarly used at each grapple 14 but simple buttress stops 43 as shown in the right hand grapple 14 of FIG. 1 may be employed.

The relaxation of the grip on the pipe 16 allows the thrust plate 19 cooperating with the thrust yoke 38 to axially move the spigot end of the pipe 16 as shown into the bell end 16a. By this extent of thrust the jaws 15 are thrust full open and the pipe 16 is cleared by the jaws for repetitive actuation on a new section of pipe 16. While illustrated in reference to bell and spigot pipe those familiar in the pipe laying art will appreciate that by sizing of the thrust yoke 38 the device may be used in collar pipe situations.

In FIG. 3 the structure expressed in FIG. 2 is better understood since the fulcrum established by the pin 17 is rendered more clear and the toggle elements 34 pivotally connected to the center link 33 by pivot elements 44 and to the draw bars 45. The draw bars 45 are pivotally secured to the jaws 15 so that the grapple linkage 14 is opened as the center link 33 is shifted away from the center position. In addition, the rubber or resin blocks 46 are seen facing the grips 41 in contact with the pipe 16. In the FIG. 3 it will also be appreciated that the jaws 15 are made up of pairs of spaced apart body elements 47 retained and stiffened in the spaced relation by the webbing strut 48.

In FIG. 4 the thrust yoke 38 fixed to one end of the frame 12 is shown in position against the bell portion 39 of the pipe 16. Three size adjusting blocks 44 are seen as inserts allowing the yoke 38 to be adapted to various sizes of pipe or tubing.

FIG. 5 in contrast with FIG. 3 shows the jaws 15 at full open under the influence of the shift of rod 30 full to the right as shown relaxing the compression spring 36 and allowing the tension spring 37 to move the center link 33 to the position as shown. As will be appreciated the compression and tension, as well as the positioning of the stops 35 will influence the point of complete opening of the structure 11. By virtue of moving the rod 30 relative to the thrust plate 19 plural grapples 14 may be used depending upon the length of tubing or piping to be handled and all operate in unison providing relaxation of grip for longitudinal or axial shifting of the pipe 16. FIG. 6 shows a modified form of the present invention to align and abut two adjacent sections of pipe or tubing 51 by substituting a gripping element 52 for the yoke 38 as previously described. This is very simply accomplished by reversing the grapple 14 and adjusting the stop 53 to close the gripping element 52 as relaxation occurs in the grapple 14. This converts the gripping element 52 into a thrust buttress equivalent of the thrust yoke 38 without the benefit of the bell of the pipe 16. Hence as the piston 28 is actuated for applying axial thrust to the tubing, the grapple elements 14 relax as previously described and the gripper 52 tightens.

FIG. 7 indicates the simple modification of the gripper 52 in initial full open position with actuator rod 30 at full travel to the left as shown. A bracket 29' and journal 30' are secured to the end of the frame 12 and thus provides a lineal guide for push rod movement. The stop 53 is set to engage compression spring 36' at a predetermined point of travel to move the center link 33' toward center. In other respects the gripper 52 follows the structural description of grapples 14.

FIG. 8 indicates the versatility of the present invention by showing modified jaw elements 60 substituting for the yoke 38 by providing a thrust buttress in the trench 61 in which the pipe 62 is to be positioned. As in FIGS. 6 and 7 the grapple linkage 63 is as previously described at the end of the frame 12, but as the jaw elements 60 expand, timed ahead of the thrust stroke of the piston 28, the spike faces 64 are driven outward and into the earth forming the walls of the trench 61. This is convenient with straight side uncollared pipe 62 and may be sequenced as desired using the description structure.

In operation the present device speeds pipe laying handling and manipulation by providing full range of movement without extensive manual manipulation of the pipe. As adjusted to the sequence of a particular job the pipe is lifted, oriented, positioned and aligned, the grip is selectively relaxed and the pipe is automatically moved on its axis then the grip is fully released from repetitive usage. The simplicity of the structure and the complete shrouding of the single lineal actuator makes the device field rugged as such equipment must be. The toggle linkages are exposed for adjustment and sequence changing making field servicing very simple. By varying the sizes of toggle links various pipe sizes can be accommodated. The telescoping movement of the extension frame in relation to the back frame admits of simple construction. Selected timing through a wide range of gripping, relaxation, and full release is made available.

Having thus described operative embodiments of our invention, others skilled in the art will perceive improvements, modifications and changes within the skill of the art and such improvements, modifications and changes are intended to be included hereunder in accord with the scope of the hereinafter appended claims.

We claim:

1. A pipe positioning and handling device selectively relaxing, opening and closing grapple elements made a part thereof comprising:
   a tubular main frame;
   a frame extension in telescoping relation over one end of said tubular main frame;
   actuating means in said main frame whereby said frame extension is axially movable in respect thereto;
   a rod secured to said frame extension and movable therewith in parallel offset relation;
   grapple elements on said main frame selectively actuatable to opening, closing, and relaxing by movement of said rod in engagement therewith; and
   a push plate on the end of said frame extension and movable in accord with movement of said frame extension and said rod.

2. The combination as set forth in claim 1 wherein said grapple is selectively engageable with stop elements selectively locatable on said rod for opening and closing said grapple elements.

3. The combination in accord with claim 2 wherein a compression buffer spring is between said stop elements and said grapple elements.

4. The combination in accord with claim 3 wherein tension springs act upon said grapple elements upon selected relaxation of said compression spring elements and apply an opening bias to said grapple elements.

5. A grapple and manipulating device for tubing and pipe comprising:
   a tubular main frame;
   a thrust yoke element secured to one end of said main frame;
   a tubular frame extension including a depending thrust plate over said main frame at the end opposite to said thrust yoke element;
   an actuating rod on said frame extension and movable therewith, said rod being parallel to and offset from said main frame;
   a bail element supporting said main frame at the approximate center thereof;
   a rotary motor secured to said bail element;
   a lineal motor in said main frame and secured thereto and drivably connected to said frame extension;
   grapple frames in spaced relation on said main frame;
   jaws pivotally secured to said grapple frames;
   a position expandable link between each of said jaws and on said rod; and
   engaging means on said rod and in selected engagement with said position expandible links whereby selected of said jaws are opened and closed in accord with movement of said rod and said frame extension.